E. J. HAGAN.
SANITARY POULTRY ROOST.
APPLICATION FILED MAY 13, 1915.

1,154,392.

Patented Sept. 21, 1915.

Inventor
Elijah J. Hagan
By
Attorneys

UNITED STATES PATENT OFFICE.

ELIJAH J. HAGAN, OF BRUSH, COLORADO.

SANITARY POULTRY-ROOST.

1,154,392.  Specification of Letters Patent.  Patented Sept. 21, 1915.

Application filed May 13, 1915. Serial No. 27,893.

*To all whom it may concern:*

Be it known that I, ELIJAH J. HAGAN, a citizen of the United States, residing at Brush, in county of Morgan and State of Colorado, have invented certain new and useful Improvements in Sanitary Poultry-Roosts, of which the following is a specification.

My invention relates to an improvement in sanitary poultry-roosts, and the object is to provide a roost which is practically vermin-proof, and which can be taken apart and removed at will, as well as replaced after the poultry-house, or they themselves, have been cleaned and are ready for further use.

My invention consists in a roost comprising a trough adapted to contain a liquid vermicide, and a perch detachably connected with the trough and provided with means for keeping the perch saturated with vermicide through capillary attraction.

Figure 1:
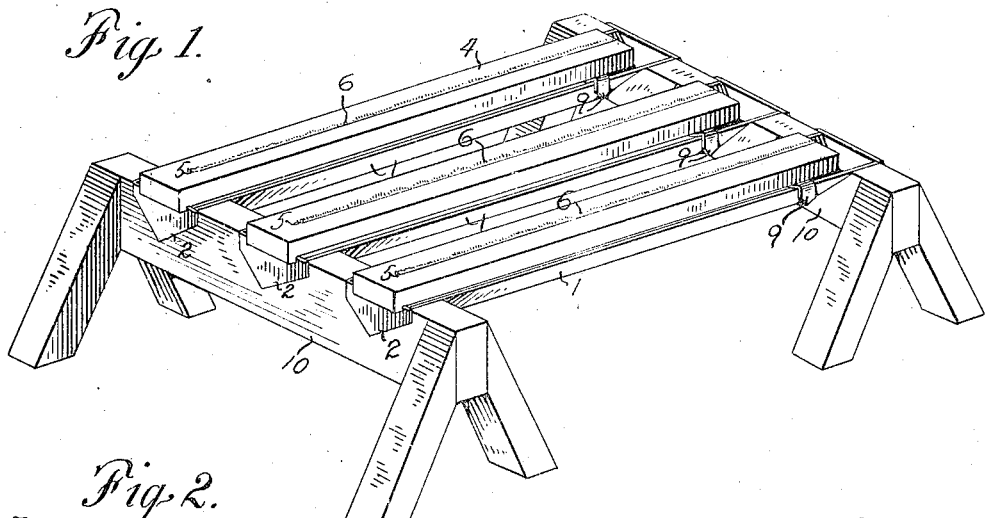
Figure 2:
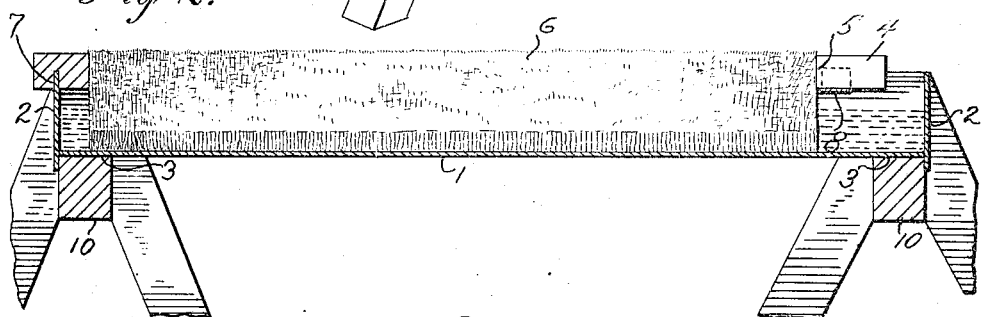
Figure 3:
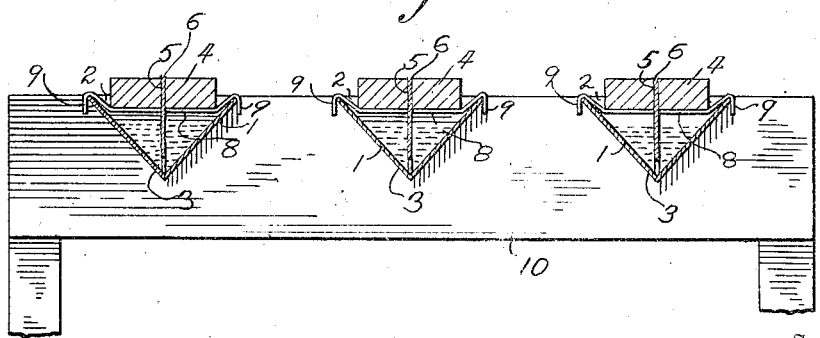

In the accompanying drawings:—Figure 1 is a view in perspective; Fig. 2 is a longitudinal sectional view; and Fig. 3 is a transverse section.

The roost consists of a sheet-metal trough or gutter 1, preferably V or U-shaped in cross-section, adapted to contain a liquid disinfectant or vermicide, and having ends 2, 2, of preferably slightly larger size than the transverse area of the trough to overhang the notched supports 3 on which the roost rests to prevent endwise movement of the roost. Detachably mounted on top of the trough is the perch 4. This is preferably either made in two pieces or slotted longitudinally through the center, as at 5, and has a wicking 6 secured therein. The wicking depends into the liquid contained in the trough whereby through capillary attraction the perch is kept moist and more or less saturated with the liquid contents of the trough. The perch is provided with any approved means for supporting it on the trough, as for instance the kerf 7 at one end to receive the end of the trough, and with a spanner 8 at or near the other end, the ends 9 of which spanner are bent downwardly, and which spanner embraces the edges of the trough, supporting the perch thereon, and preventing lateral displacement thereof, so between the spanner 8 and the saw-kerf 7 the perch is removably held supported on the trough, and yet prevented from accidental displacement either endwise or laterally. The roost thus composed of trough and perch detachably connected together, may be supported in any approved way, as for instance on the notched benches 10, 10, or by cross-bars in the poultry-house, or in brackets (not shown) secured therein.

A roost of this character is easily constructed, is composed of few parts, and is capable of being kept clean and vermin-proof with a minimum of labor. At the same time it is sanitary, as the liquid employed may be a deodorizer as well as a disinfectant and germicide.

Obviously the number and proportions of the roosts may be varied to suit requirements, without departing from the spirit and scope of my invention.

I claim:

1. A roost composed of a trough adapted to contain liquid, and a perch having a wick extending therethrough and removably supported on the trough, with means for preventing lateral or longitudinal displacement.

2. A roost composed of a trough adapted to contain liquid, and a perch having a wick extending therethrough and removably supported on the trough, with means for preventing lateral or longitudinal displacement, a notched support for said roost, and means for preventing the roost from endwise movement on the support.

3. A roost comprising a trough adapted to contain a liquid and having flanged ends, and a perch having a wicking extending therethrough, said perch having a transverse kerf to receive the upper edge of one of the ends to prevent endwise movement of the perch, and a spanner having downwardly bent ends to rest upon and embrace the edges of the trough to prevent lateral displacement.

In testimony whereof I affix my signature, in the presence of two witnesses.

ELIJAH J. HAGAN.

Witnesses:
EMORY E. AMIND,
B. F. SHANHOLTZER.